D. H. SMITH.
REVERSIBLE MULTIFURROW DISK PLOW.
APPLICATION FILED JULY 31, 1908.
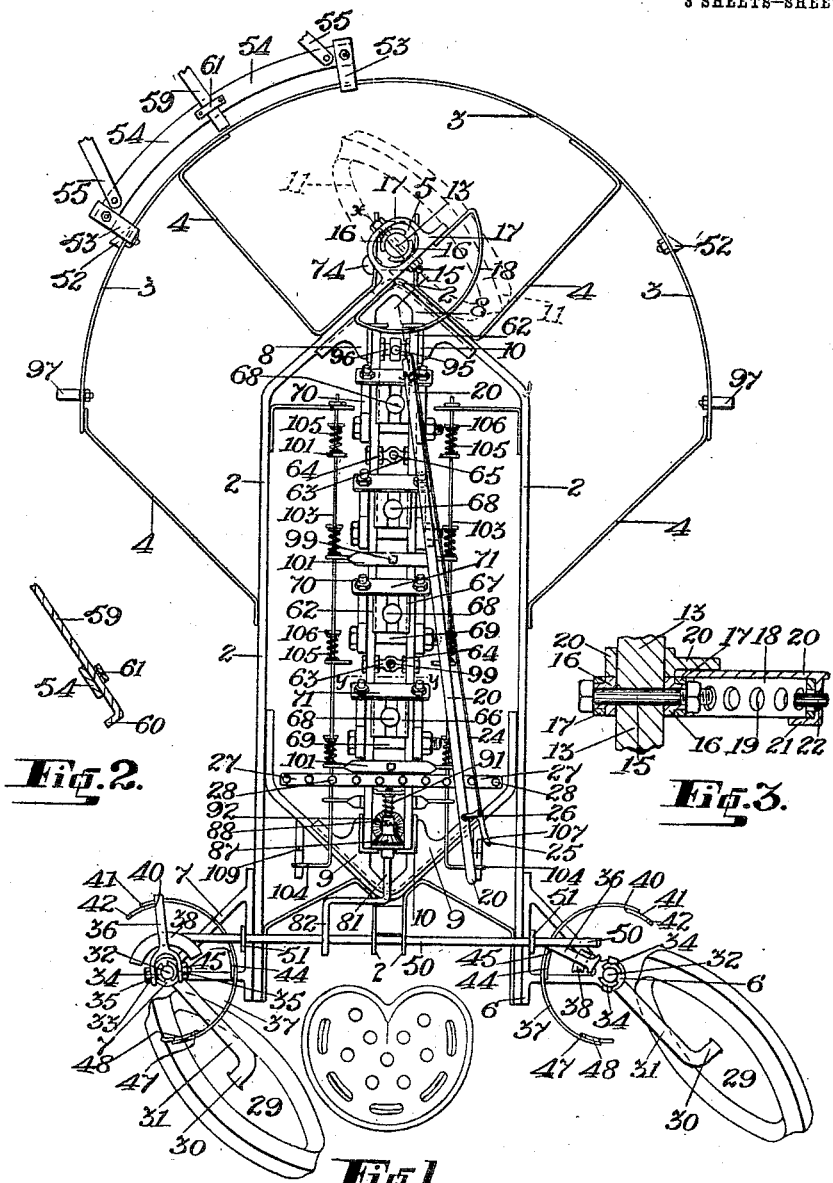

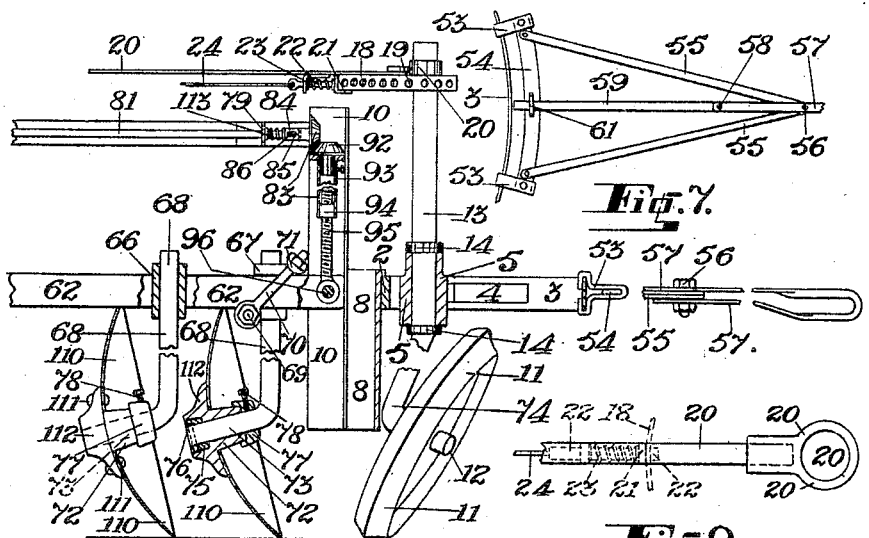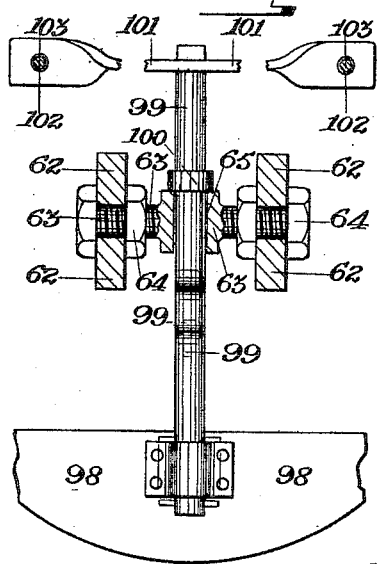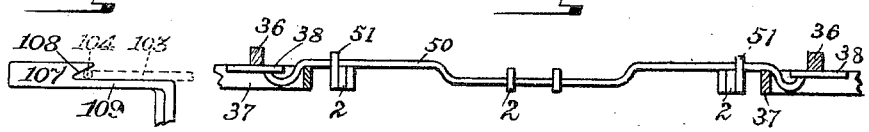

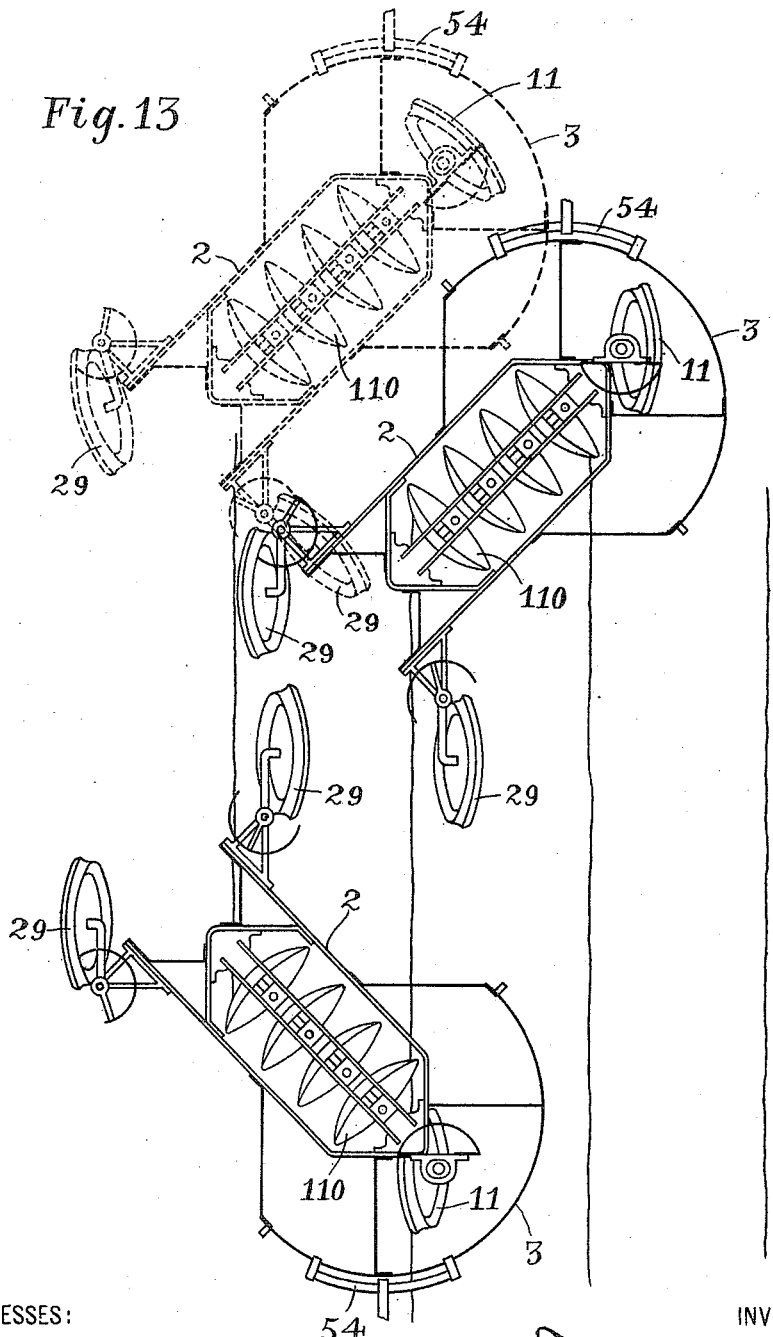

UNITED STATES PATENT OFFICE.

DONALD HERMAN SMITH, OF NEAR CURLEWIS, NEW SOUTH WALES, AUSTRALIA.

REVERSIBLE MULTIFURROW DISK PLOW.

971,157. Specification of Letters Patent. Patented Sept. 27, 1910.

Application filed July 31, 1908. Serial No. 446,343.

*To all whom it may concern:*

Be it known that I, DONALD HERMAN SMITH, a subject of the King of Great Britain and Ireland, residing upon the "Benningholm" farm, near the post town of Curlewis, in the county of Curlewis, State of New South Wales, Commonwealth of Australia, farmer, have invented a certain new and useful Improved Reversible Multifurrow Disk Plow, of which the following is a specification.

This invention relates to that class of plow equipped with a plurality of disks, arranged in line upon separate axles, and one of its eminent contemplations is to provide an implement capable of assuming a position for a return journey without its disks making unnecessary travel, the draft being materially increased or the implement unduly strained.

According to this invention the plow, at the end of the furrows produced by its passage, may attain an attitude for its progress in the reverse direction with celerity and comparative ease, the main body and disks moving through approximately only ninety degrees (90°) although the draft animals traverse, necessarily, one hundred and eighty degrees (180°).

By this present invention, upon the completion of a furrow, a furrow wheel and steering wheel are released from the position by which they have been restraining the plow. Following the line of least resistance and being unhindered the implement immediately runs out of alinement with and clear of the furrows it has completed (at nearly right angles thereto) over or on to the unplowed land. The draft animals are then turned toward the plowed or furrowed land and draw with them the draft bars. These slide around a semicircular front of the framework and upon reaching the end of the said front by a continuation of the draft over the furrowed land, the plow swings for about ninety degrees (90°) to attain the correct cutting side of the disks, furrow width and line of draft. The line of draft, when the plow is ready to proceed, has therefore been transferred from one side of the framework front to the other. The disks are situated beneath the framework of the implement, which, it will be conceived, is drawn from one side of the semicircular front end and are capable of being elevated or depressed in relation to the ground and the said framework, either in unity or one end of the series at a time. Bearing inside each disk is a scraper adapted to be partially turned so that the upgoing side of each disk is always freed of accumulations. The furrow wheels may be employed in a trailing situation or be utilized in a reverse or forward position as preferred. The disks further are retained in a state of perfect rigidity with the plow framework, the taking up of any slackening or looseness being speedily accomplished.

Other objects and advantages will be in part obvious and in part pointed out in the following description from which and the annexed drawings this invention will be rendered clear to those skilled in the art. It will also be apparent that the controlling features could be otherwise applied and carried out by various modifications and arrangements without departing from the spirit and scope of this said invention and that the succeeding matter is intended to be interpreted as illustrative of an embodiment at present preferred and not in a limiting sense.

Referring to the drawings which form a part of this specification—Figure 1 is a plan of this invention the steering wheel being shown in broken lines, the disks and scrapers being removed and likewise, for illustrative purposes, portion of the disk carrier raising gear, draft bars and steering lever. The means provided for operating the scrapers are clearly seen and the draft bars depicted as migrating to the opposite side of the framework front. A driver's seat is displayed merely to elucidate its relative position with the framework. Other parts have been broken away or removed for convenience of illustration. Fig. 2 is an enlarged detail sectional view of portion of the draft locking bar lucidly showing the lip on the rear end thereof. Fig. 3 is an enlarged detail sectional view on the line $x$—$x$ of Fig. 1 of the steering gear presenting to view the trunnion pieces, segment piece, front end of the steering lever and the guide beneath it. Fig. 4 is an enlarged detail side view of a front limit stop having relationship with the furrow wheels. The position assumed in reference to the semicircular pathway to which it is attached will be evident from Fig. 1. Fig. 5 is an enlarged detail side view of a middle limit stop having relationship with the furrow wheels.

The position assumed in reference to the semicircular pathway to which it is attached will be evident from Fig. 1. Fig. 6 is an enlarged detail side view of a rear limit stop having relationship with the furrow wheels. The position assumed in reference to the semicircular pathway to which it is attached will be evident from Fig. 1. Fig. 7 is a plan, on a reduced scale, appertaining to the draft bars. Fig. 8 is a side elevation, partly in section, of the front portion of a plow constructed according to this invention. The scrapers and their appendages are removed and other portions have also been broken away or omitted for convenience of illustration. Fig. 9 is a plan on an enlarged scale, of the front end of the steering lever. Fig. 10 is an enlarged detail view, on the line $y$—$y$, of Fig. 1 partly in section, of a scraper and its appurtenances. Portions have been broken away for convenience of illustration. Fig. 11 is a side elevation, partly in section, of the rear portion of a plow constructed according to this invention. The scrapers and their appendages are also been removed and other portions have also been broken away or omitted for convenience of illustration. Fig. 12 is an enlarged detail side view of a rest for a scraper altering rod. Fig. 13 is a view showing the positions of the frame plows, wheels and draft in forward and reverse operation, one position being in dotted lines; and Fig. 14 shows the relation of the spring lifting bar to the frame, to the adjusting piece and to the lifting arm.

Similar numerals of reference indicate similar or corresponding parts where they occur in the several views.

Upon considering the framework 2 it will be observed that this has a protruding semicircular front end 3 hereinafter called semicircular draw-frame (seen particularly in Fig. 1). This enables the animals to pull as from the center disk or thereabout. This semicircular draw-frame 3 is supported by extensions 4. As shown in Fig. 8, the extensions 4 are made narrower than the semicircular draw-frame 3, thus allowing the slides 53 to pass by the said extensions. To the front of the framework is attached a steering wheel stem journal 5 (Fig. 8). Near the back right hand side of the framework is attached a right furrow wheel stem bracket 6. Near the back left hand side of the framework is attached a left furrow wheel stem journal bracket 7. Inside and near to the middle of the framework is attached a front guide bracket 8 and also a rear guide bracket 9. To the said front and rear guide brackets are attached vertical guide bars 10.

Referring now to the steering wheel 11 it will be seen that this turns upon an axle 12 forming part of a stem 13 (Figs. 1, 3 and 8). Near its lower portion the said stem has a set back 74. The said stem is secured vertically in the steering wheel stem journal 5 by collars 14. Near the top of the stem 13 and through the same passes a pivot bolt 15. This bolts, to each side of the said stem, trunnion pieces 16. Upon the trunnions of these trunnion pieces pivots a bracket 17. To the said bracket is attached a segment piece 18. Each end of this may be extended. The said pivot bolt 15, the trunnion pieces 16, the bracket 17 and the segment piece 18 may occupy a different position in relation to the stem 13 than that shown. In this segment piece are adjusting holes 19. Over the top of the stem 13 and resting upon the trunnion pieces is the front end of a steering lever 20. The said front end is loose upon the stem. Beneath the said steering lever protrudes a guide 21 which retains the segment piece 18 to the said lever. In suitable guides moves a draw bolt 22, the front end of which by a spring 23 is forced into one of the adjusting holes 19. The said draw bolt is pulled out of one of the said holes 19 by the front end of a pull line or rod 24. The rear end of the said pull line or rod is pivoted to a bell crank pawl 25, which by a pivot pin 26 is pivoted to the rear end of the steering lever 20. The rear end of the said steering lever 20 rests upon a rack 27, from which upstand pins 28.

Referring now to the furrow wheels 29, it will be seen that an axle 30, at the end of an arm 31 is provided for each to turn upon. The said arm is at the bottom of a stem 32 which passes through a stem hole in one of the stem journal brackets 6 or 7 before referred to. Near the top of each stem 32 and through the same passes a pivot bolt 33. This holds trunnion pieces 34 to the said stem. Upon the trunnions of the said trunnion pieces is pivoted a fork 35, on the outer end of which is a fitting arm 36. The outer end of each lifting arm rests upon a semicircular pathway 37 secured above a stem journal bracket. Beneath the said lifting arm is a contact piece 38. To the semicircular pathway 37 (Figs. 1, 4, 5, 6 and 11) is attached a front limit stop 39. This has a step 40, an inclined top 41 and a double step 42. Secured at or near the middle of the said semicircular pathway is a middle limit stop 43. This has an inclined top 44 and a step 45. Near the back of the said semicircular pathway is situated a rear limit stop 46. This has an inclined top, a double step 47 and a pocket 48. The said limit stops are attached to the semicircular pathway by a holding bolt or bolts passing through an elongated slot 49 in each, thereby rendering them adjustable around the said pathway 37.

Upon referring to the spring cross bar 50 extending across the top of the framework (Figs. 1, 11 and 14) at the rear of the machine, and near the top of the semicircular pathway 37, it will be evident that this may be prevented from moving longitudinally by suitable guides 51 in which it rests. Each end of the spring cross bar passes underneath a contact piece 38. The said bar may at its center bear in a slot in the framework as seen in Fig. 11 its outer ends protruding upwardly to bear beneath the contact pieces 38.

Referring now to the draft it will be seen that to the radius bar 3 are attached inner stops 52 adjustable in a longitudinal slot (not shown) in the semicircular draw-frame 3 and outer stops 97. Partially surrounding the said semi-circular draw frame and capable of sliding freely thereon are slides 53 (Figs. 1, 7 and 8). These are united together by a tie piece 54. To the said tie piece are attached the rear ends of draft bars 55. The front ends of the said draft bars are united by a pivot pin 56. Intermediately pivoted to the said pivot pin 56 is an intermediately pivoted lever 57 having on its front end a draft hook. On its rear end is a pivot pin 58. To this pivot pin 58 is pivoted the front end of a locking bar 59. The rear end of the locking bar has a lip 60 thereon. The said locking bar passes through a guide 61 attached to the tie piece 54.

Referring now to the vertically sliding disk carrier it will be seen that between the vertical guide bars 10 are situated disk beams 62 (Figs. 1, 8, 10 and 11). These beams are united by cross bars 63 adjusted by nuts 64. In each cross bar is a scraper stem hole 65. Between the said disk beams are situated disk stem holders 66. Each one has a lip 67 to prevent it falling. In between the said disk stem holders is situated a disk stem 68. This stem has on its lower end a reinforcing attachment consisting of a draw bolt 69 which passes from one side of the disk beams to the other. Two ring bolts 70, one on each side, are secured to the said draw bolt 69 and the upper ends of the said ring bolts pass through a cross plate 71.

Referring now to the disks and their attachments, it will be seen that each disk 110 is attached by rivets or bolts 111 to a flange 112 (Figs. 8 and 11). This forms part of a bush 72 which turns upon an axle 73 below the disk stem 68. In the back of the bush is a recesss. In this recess is placed a sleeve 75 through which passes a pin 76. Upon the axle 73 is a dust excluding ring 77 locked by a locking screw 78. Assemblage takes place as follows: The ring 77 is placed upon the axle. Then follows the bush 72. This is pushed well on. The sleeve 75 is then installed and the pin 76 inserted. The bush 72 is pulled backwardly and with it the collar 77. The locking screw 78 is then tightened.

Referring now to the disk carrier raising gear, it will be seen that (Figs. 1, 8 and 11) in a front bearing 79 and a rear bearing 80 is a shaft 81. This is turned by a handle 82. Upon the front end of the said shaft is situated a front bevel wheel 83. This is free to move circumferentially upon the shaft which moves longitudinally through it. From its boss protrude teeth. These engage with teeth in the sleeve of a front clutch 84. This front clutch has a slot 85 therein which accommodates a front stop pin 86, the inner end of which stop pin is secured to the shaft. Around the shaft and between the rear end of the clutch sleeve and the bearing 79 is a front spring 113. Near the rear end of the said shaft is a rear bevel wheel 87. Protruding from the boss thereon are teeth. Into these teeth engage the teeth of the sleeve of a rear clutch 88. The said rear clutch 88 has a slot 89 therein to accommodate a pin 90 the inner end of which is secured to the shaft. On the front end of the said clutch sleeve presses a rear spring 91 the front end of which presses against the rear bearing 80. Gearing with the front bevel wheel is a lower bevel wheeel 92. To the boss of each bevel wheel 92 is attached the top of a cylinder. To the lower end of each cylinder is attached a nut 94. This nut turns loosely around a raising screw 95. Each raising screw is pivoted by a pivot pin 96 to the disk beams 62. Should the driver wish to elevate or depress one end of the disk series without altering the position of the other, he merely presses forward the shaft 81 or draws it backwardly as circumstances require. One clutch is then disengaged by the action of its pin (secured to the shaft) in the slot of its sleeve. Its respective bevel wheel cannot rotate being loose upon the shaft. Should the whole series of disks require to be moved bodily, the handle of the shaft is rotated without any longitudinal movement the springs keeping their relative clutch sleeves engaged with their respective bevel wheels.

Referring now to the scraper (Figs. 1 and 10) it will be seen that this consists of a piece of sheet metal 98 having a semicircular shaped bottom and in plan of suitable conformation to fit inside a disk. It is attached to the lower portion of a stem 99, which stem pivots in a cross bar 63, and may have a kink therein or be otherwise bent or formed to force the scraper hard upon the disk when operated. The said stem is supported by a collar 100. To the stem top is attached the middle of a yoke 101. In each end of the yoke is a hole 102. Through each hole 102 passes an altering rod 103 capable of partial rotation. The said altering rod has at its rear end a foot piece 104. Around the rod are springs 105. These are in compression. One end of each spring presses against a yoke and the other against a stop 106. Beneath each foot piece 104 is a rest 107 (Fig. 12). Upon this the said foot piece reposes. Near the front of each rest is an inclined shoulder 108. Below this is a step 109. A driver's seat is provided and is made movable by any well known means to allow him to be in a line with the draft.

This invention is operated as follows:— The steering wheel moves within the last furrow previously cut. One of the furrow wheels also moves in a furrow. In Fig. 1 this would be the right hand one. The other furrow wheel moves on the unplowed land and is therefore actually a land wheel but a furrow wheel when the plow is reversed. When a furrow is completed the driver presses upon or near the center of the spring cross bar 50. This inks in the middle and its two ends rise. As they rise they lift the contact pieces 38 and thereby the lifting arms 36. These pass above the limit stops with which they have been engaged, the left hand arm 36 (Fig. 1) moving from the limit stop 40 to the stop 42 and the right hand arm moving from the stop 45 over the inclined top 44 to, upon further movement of the plow, the stop 47. It will thus be seen that the left lifting arm has practically no travel while the right hand one has in this instance. Immediately the driver places his foot upon the spring cross bar 50 he also lifts the steering lever above the pins from the rack and moves the lever so as to direct the said steering wheel, below the plow framework, over the plowed or furrowed land. If the wheel is not sufficiently turned he presses upon the bell crank lever 25. This strains the pull line 24, compresses the spring 23 and moves the draw bolt 22 from one of the adjusting holes 19 in the segment piece 18. He then moves the lever so as to obtain a fresh purchase upon the segment piece 18. Having done this he releases the bell crank lever 25 and the spring reasserting itself the steering lever is locked to the segment piece. Further movement of the steering wheel can then be effected. Immediately the plow is freed by the release of the furrow and steering wheels it plunges spontaneously and bodily landward. It moves upon the unplowed land, approximately the width of a furrow. The draft animals are then turned and pull toward the plowed land. As they move the draft hook on the front of the intermediately pivoted lever 57 also moves. The said lever turns upon the pivot pin 56 and the rear end of the lever, through the pivot pin 58, carries the locking bar 59 forward. As it moves forward it clears the inner stop 52. The lip 60 prevents the further forward movement of the lever 57 since it bears against the inside of the tie piece 54. As the horses continue moving the slides 53 slide around the radius bar 3 until the slide 53, passing the stop 52, strikes against an outer stop 97. The horses continue to move around now upon the plowed or furrowed land and the front end of the framework follows them, the rear end swinging around. The point upon which the plow pivots, in Fig. 1, would be near the first disk. When the left furrow wheel (late land wheel) is in the extreme left hand furrow of the last journey, by the steering lever, the steering wheel is directed to the correct angle. The plow is ready for the retracement of its steps, the disks naturally reversing their rotation when the plow moves on its return journey. Should it be desired or preferred to run the furrow wheels in a forward position (the reverse to that shown in Fig. 1) the arms 36 are turned and placed in the pockets 48 of the rear limit stops 46. The scrapers 98 are pressed against the inside of the respective up going side of the disks as follows:—The driver presses his foot against, perhaps, the right hand foot piece 104. The said foot piece then slides forwardly along the rest 107 and the right hand altering rod 103 moves forward. The springs on the left hand altering rod expand there being no balancing compression from those on the right hand altering rod, and press their yokes backward. The scrapers are thereby pressed upon the inside of the disk. When the foot piece 104 reaches the inclined shoulder 108 it falls downwardly and rests upon the step 109. When the plow is reversed and the scrapers are to be applied to the other up going inside of the disk, the right foot piece is elevated by the foot above the inclined shoulder 108 and the other foot piece 104 forced forwardly until it falls against its inclined shoulder 108. The other side of the scrapers then presses against the other side of the disks.

From the foregoing it will be obvious that the better a person can drive the better the plow will turn at the end of a passage and the cleaner its disks will cut. An irregular field can be finished more quickly than at present and with less waste of unplowed land by this invention.

Having now described my invention what I claim as new and desire to secure by Letters Patent is:—

1. In an improved reversible multi-furrow disk plow, a framework having a semicircular draw frame supported by extensions, a steering wheel stem journal near the front of said framework, a right and a left furrow wheel stem journal bracket at the rear of said framework, a front guide bracket and a rear guide bracket, said front and rear guide brackets supporting vertical guide bars.

2. In a reversible multi-furrow disk plow, a steering wheel stem, an axle attached thereto, a wheel rotating on the stem axle, trunnion pieces bolted to said stem, a bracket pivoted to the trunnion pieces and provided with a perforated segment piece, a lever attached to the top of the stem, a guide located beneath the lever and connected therewith, a draw-bolt attached to the guide and engaging with its forward end the perforations in the segment, a spring controlling the draw-bolt, and means for operating the draw-bolt, substantially as described.

3. In a reversible multi-furrow disk plow, the combination of a steering stem having at its lower out-turned end an axle, a wheel turning thereon, trunnion-pieces bolted to said stem, said stem having pivoted thereto a fork provided with a projecting arm, a contact piece located beneath said arm, and an underlying pathway for the arm provided with limit stops, substantially as set forth.

4. In a reversible multi-furrow disk plow, a pair of furrow wheel stems provided with outwardly extending arms, contact pieces attached thereto, in combination with a spring cross-bar provided with guides and having its outer ends resting beneath said contact pieces, substantially as set forth.

5. In an improved reversible multi-furrow disk plow, a semicircular draw frame upon which are inner and outer stops, slides on said radius bar, a tie piece between said slides, draft bars attached to said tie pieces, a pivot pin near the front of said draft bars to which is intermediately pivoted a lever having a draft hook on its front end, a pivot pin on its rear end pivoted to a locking bar, said locking bar passing through a guide and having a lip upon its rear end.

6. In a reversible multi-furrow disk plow, disk beams, cross-bars provided with scraper stem holders securing the disk beams, disk stems located between said holders, the holders and disk stems being secured to the disk beams by draw-bolts, ring-bolts, and cross-plates, substantially as set forth.

7. In a multi-furrow plow disk, a plow frame, vertical bars attached thereto, a shaft having front and rear bearings in said bars and movable longitudinally therein, front and rear toothed clutches longitudinally movable on said shaft, bevel wheels turning loosely on the front and rear ends of the shaft provided with toothed bosses normally engaging the shaft clutches, means for holding the teeth in gear, bevel wheels engaging the bevel wheels on the shaft and provided with cylindrical bosses, vertically movable disk carriers, screws pivoted thereto and engaging the cylindrical bosses, and means for imparting longitudinal and rotary motion to the shaft, substantially as described.

8. In a reversible multi-furrow disk plow, a scraper in front of each disk, a stem attached to each scraper, a yoke at the top of the stem, holes in the yoke ends, an altering rod passing through each hole, a foot piece on said altering rods reposing upon a rest, springs pressing against each yoke and against a stop.

9. An improved reversible multi-furrow disk plow, consisting of a framework mounted on a front steering wheel and a right and left furrow wheel, a series of disks near the middle of said framework, means for elevating or lowering said disks on their front or rear ends, means for releasing said furrow wheels and turning said steering wheel at the end of a journey allowing said plow to run on to unplowed land, substantially as set forth.

10. In a reversible multi-furrow disk plow, a semicircular draw-frame, a draft gear movable on the draw-frame, inner stops on said draw-frame, a lock bar engaging said stops, in combination with an intermediately pivoted lever, actuating said lock bar.

11. In a reversible multi-furrow disk plow, a steering wheel stem, a wheel mounted on said stem, a lever controlling the steering-wheel and loosely mounted on the stem, trunnion pieces secured near the top of the stem and carrying a perforated segment, in combination with a draw-bolt on the lever, adapted to engage the perforated segment, substantially as set forth.

12. In a reversible multi-furrow plow disk, a stem, a wheel rotating thereon, trunnion pieces bolted to the top of said stem, a bracket pivoted to the trunnion pieces and carrying a circular segment provided with perforations, a lever loosely turning on the stem and provided with guiding means, a draw-bolt attached to said guiding means and coöperating with the perforations in the segment, substantially as described.

In testimony whereof I affix my signature in the presence of two subscribing witnesses.

DONALD HERMAN SMITH.

Witnesses:
 EDWIN PHILLIPS,
 CECIL W. LE PLASTRIER.